March 18, 1969 H. B. KADAH 3,434,013
PANEL MOUNT

Filed April 25, 1967 Sheet 1 of 2

INVENTOR.
HASSAN B. KADAH.

BY

ATTORNEY

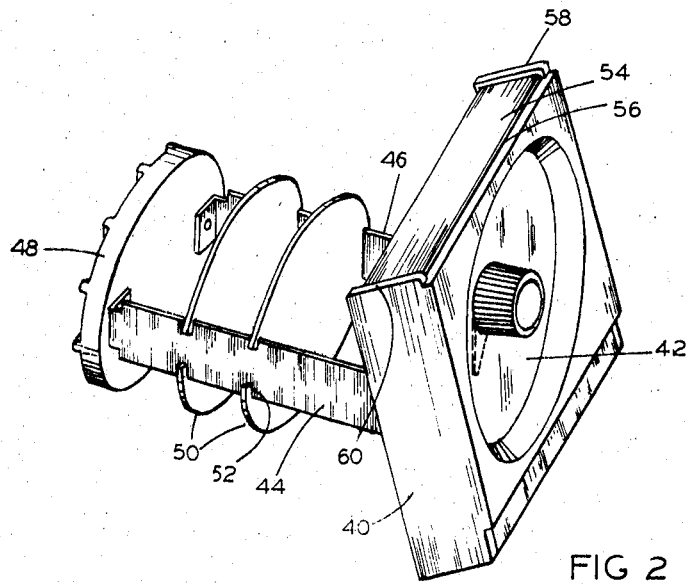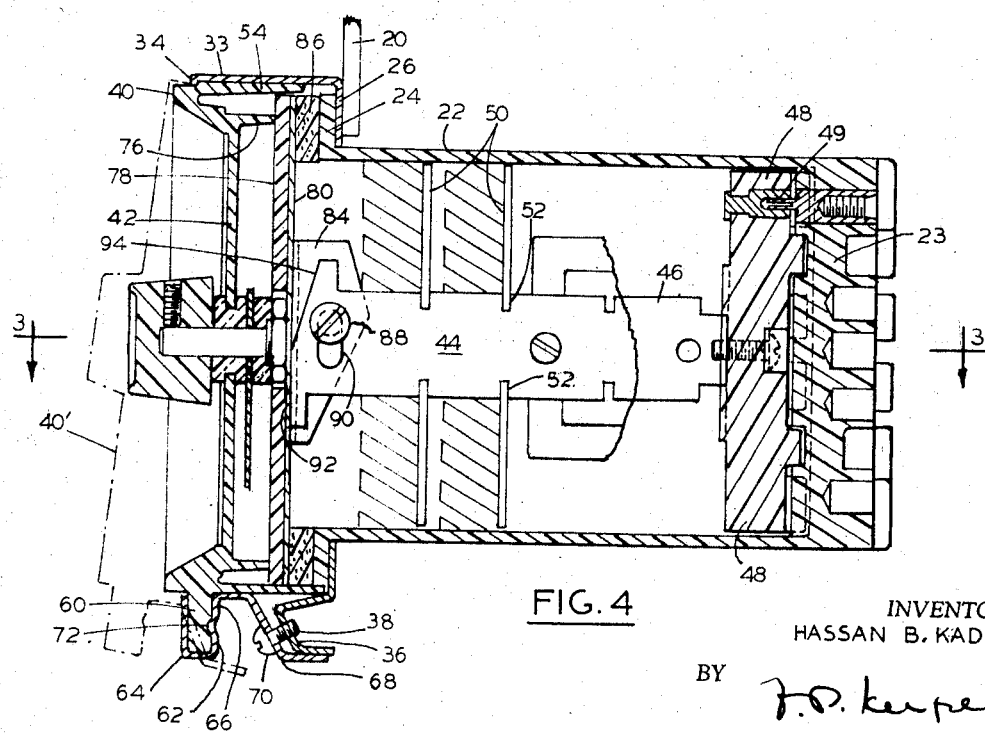

United States Patent Office 3,434,013
Patented Mar. 18, 1969

3,434,013
PANEL MOUNT
Hassan B. Kadah, P.O. Box 566, Syracuse, N.Y. 13201
Filed Apr. 25, 1967, Ser. No. 633,500
U.S. Cl. 317—99
Int. Cl. H02b 1/04, 13/02
6 Claims

ABSTRACT OF THE DISCLOSURE

A panel mount housing is adapted to receive an electrical apparatus assembly having an indicating bezel at one end adapted to seal the housing, the electrical apparatus portion of the assembly being adapted to be inserted into the housing correctly oriented for electrical plug in connections by manipulating the bezel into a predetermined location to seal the housing, the bezel having pivoted and limited lateral movement with respect to the electrical apparatus.

---

This invention relates to electrical apparatus and a protective mounting therefor, into and from which the apparatus as an assembly may with correct orientation be quickly inserted and removed for replacement and servicing.

More particularly the apparatus comprises a water tight housing adapted for panel mounting, the housing having plug in connections adapted to make connections with an electrical assembly, when inserted in the housing. Additionally, the housing and assembly are readily assembled and locked in place, with suitable moisture seals for protecting the assembly from foreign matter. The assembly is provided with a bezel member and indicator dial which may have a manual control. The member coacts with the housing in such a way as to permit quick removal and replacement of the apparatus and the bezel member in respect to the housing, in a predetermined foolproof manner. The bezel member is so connected with the apparatus as to permit the member to be laterally movable into a single position, while the apparatus moves rectilinearly with correct orientation in respect to the housing.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 2 is a perspective view of the electrical assembly and control, adapted to cooperate with the housing of FIGURE 1;

FIGURE 4 is a sectional view with parts in elevation of the electrical assembly and housing, taken on a line as indicated at 4—4 in FIGURE 3, insofar as the assembly is concerned.

Figure 1:
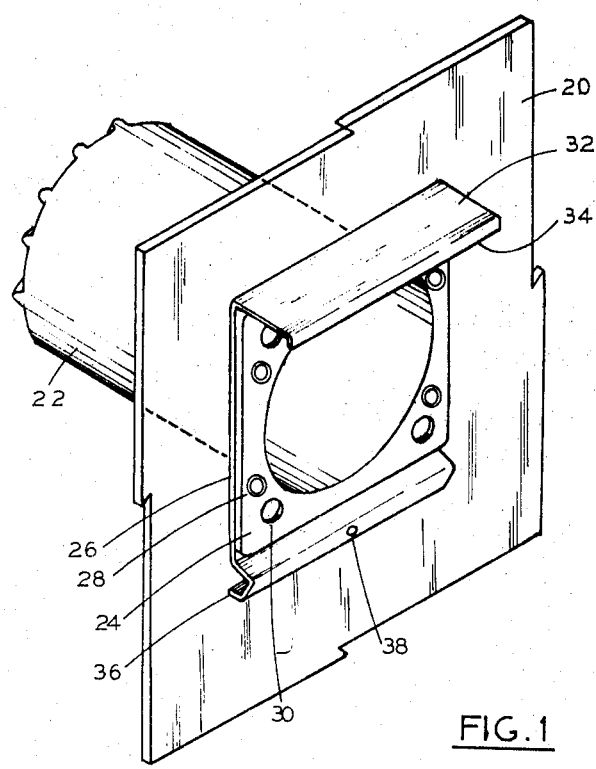
FIGURE 1 is a perspective view of the housing member applied to a panel.
Figure 3:
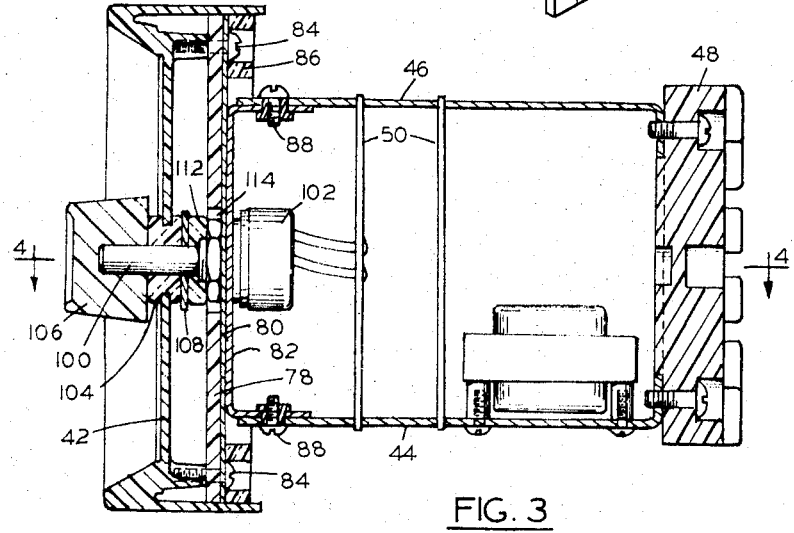
FIGURE 3 is a sectional view through the electrical assembly taken on the line 3—3 of FIGURE 4.

Referring to FIGURE 1, there is shown a panel 20 having a large circular aperture in which, is mounted the cylindrical housing 22, formed of suitable plastic. Such housing is provided with an integral relatively square flange 24, behind which is a flanged plate 26, which may be secured to the flange as by a plurality of flat head screws 28 threaded into the plate 26. Apertures for panel mounting screws as at 30 are provided. The plate 26 is provided with an upper flange 32, having a outer lip 34, to form a channel, and a lower inclined anchoring means in the form of a channel section flange 36, having a threaded aperture centrally located therein as at 38.

The electrical apparatus assembly as shown in FIGURE 2, comprises a relatively square end member 40 having an integral transparent bezel 42. The end member has mounted on the rear thereof, by hinged connections, spaced parallel circuit board support straps or arms 44 and 46 which are secured to an end terminal pin block or contact disk 48. The straps may be notched as at 52 to receive and support one or more circular solid state circuit boards such as 50.

The upper surface 54 of the end member 40 is shaped to fit up against the underside of the channel formed by the flange 32, and lip 34 with the lip over hanging the shoulder 56. Raised end portions 58 and 60, spaced apart by the length of the flange 32 are adapted to lie flush with the upper and outer surfaces 54 and 56 of the flange 32 and lip 34, when the upper end of the end member 40 is seated up against the inside surfaces of the flange 32 and lip 34.

In FIGURE 4 the electrical assembly is shown mounted within the housing and secured in place. As shown, the disk 48, with its plug-in connections 49 which cooperate with complemetary connections in the end wall 23 of the housing 22, are shown in connected relation, and the bezel end member 40 is shown with its upper edge seated in the flange 32, behind lip 34. Mounted on a transverse integral flange 60 of the end member 40, is a handle member 62 having a channel section 64 closely embracing the flange 60, and having a reverse channel 66 to serve as a finger grip, and a locking flange 68 adapted to be secured to the channel flange 36 by an inclined screw 70. The member 62 may be secured to the flange 60, by two or more blisters struck up and interfitting in corresponding recesses 72 in the back face of the flange 60, the handle member being of somewhat resilient metal such as stainless steel, and thereby being adapted to be snapped into place.

Held against the inner edge of a circular flange 76 disposed around the circular transparent bezel 42 of the end member 40, is a substantially square white translucent plastic dial background plate 78, which may be of Plexiglas. Immediately behind the dial plate is a bezel mounting plate 80 having a hinge bracket 82 upon which are pivotally mounted the arms 44 and 46 of the electrical assembly. The plate 80 and translucent dial plate 78 are secured to the bezel end member 40 by screws 84 extending through the plate 80, dial plate 78 and threaded into apertures molded in the corner areas outside the flange 76 in the end member 40. Immediately behind the plate 80 is a gasket 86 in the form of a substantially square open frame, such gasket having apertures in its corner areas for access to the screws 84. The gasket 86 bears against the flange 24, and is compressed to provide a seal, when the end member 40 is locked in place, as shown in FIGURE 4.

The arms 44 and 46 are pivotally attached to the hinge bracket member 82 by screws having sleeved nuts drawn tight together to form pivot pins 8 extending through circular apertures in the bracket member 82, and slotted apertures 90 in the arms 44 and 46, so that free pivotal movement, or sliding movement is afforded, without endangering the loosening of the pivot pins. The arms 44 and 46, are provided with heel and toe portions 92 and 94, adapted to abut the plate 80, and limit the angular movement of the arms in respect to the plate.

By reason of the pivot pins 88 and slots 90, the arms 44, 46 with their circular circuit boards, and connector disk 48 are readily slid into the housing 22 axially, while the end member 40 is dropped downward so that it can approach the panel at an angle as indicated at 40' in FIGURE 4, or as also shown in FIGURE 2, so that the upper end 54 of the end member can be nested within the flange 32, as the end member 40 is swung into parallel relation with the panel 20. When so positioned the bezel becomes coaxial with the electrical apparatus and housing 22, whereupon, the screw 70 is threaded into the aperture 38 of the flange 36, and the apparatus locked in place within the housing, with the gasket 86 placed under compression to provide a seal.

The bezel 42 has the stem 100 of a rheostat or control member 102, projecting through an aperture in which is fitted an externally grooved annular rubber or neoprene grommet 104, to seal the bezel aperture. A control knob 106 is affixed to the end of the stem or shaft 100, and a pointer 108, suitably keyed to the shaft 100, is sandwiched in between a further resilient rubber or neoprene washer 112. The rheostat 102 is affixed to the plate 80 by a nut 114.

From the foregoing, it can be seen that the apparatus portion of the electrical assembly may be moved axially or rectilineously into the housing, while the bezel member is afforded angular and lateral movement to engage in the flange channel. As the bezel member takes the position indicated at 40' the apparatus assembly within the housing becomes correctly oriented angularly, so that the connections between the terminal member 48 and housing end will be properly made and completed upon moving the bezel member from the position indicated at 40' to the position where the screw 70 may be inserted to anchor the bezel in the position, as shown in FIGURE 4. Accurate and correct assembly is thus assured.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An electrical apparatus assembly comprising an end bezel member, bracket means secured to the rear of the bezel member, a terminal connector pin block, circuit board support arms secured at one end to said block and having at the other end a pivotal connection to said bracket means, said end bezel being adapted along one side to engage within a channel facing across the assembly, and having a finger grip and anchoring means disposed on the opposite side.

2. An assembly according to claim 1 wherein the pivotal connection includes slots to permit limited lateral movement of the bezel member with respect to the support arms.

3. A panel mount for an electrical apparatus assembly according to claim 1 comprising a tubular housing having a panel mounting flange and open at one end to receive the assembly, said flange having on one side a channel facing across the open end to receive one side of the bezel member of the assembly and complemental anchoring means disposed on the opposite side of the spring to receive the anchoring means of the bezel member.

4. A panel mount in combination with an electrical apparatus assembly according to claim 1 comprising a tubular housing having a panel mounting flange and open at one end, said flange having on one side a channel facing across the open end, and complemental anchoring means disposed on the opposite side of said opening from said channel, said electrical apparatus assembly having its terminal pin block, circuit board support arms pivotal connection, and bracket means within the housing, and having one side of its bezel member seated in said channel, and its opposite side secured to said flange through interengagement of anchoring means and the complemental anchoring means.

5. A panel mount in combination with an electrical apparatus assembly according to claim 4 wherein the housing is substantially cylindrical, and in which the arms of the assembly have circuit boards mounted thereon of a size requiring substantially axial movement of the assembly in inserting the assembly within the housing, and in which the pivotal connection includes lateral slots to permit lateral movement of the bezel member with respect to the support arms and into engagement with the channel member while moving the circuit boards and mounting arms axially in respect to the housing.

6. A panel mount according to claim 3 wherein the other end of the housing is closed by terminal block having connector elements adapted to establish electrical connections with the terminal connector pin block.

References Cited

UNITED STATES PATENTS

| | | | |
|---|---|---|---|
| 2,856,450 | 10/1958 | Padgett et al. | 174—52 |
| 2,876,277 | 3/1959 | Badger et al. | 174—52 |
| 3,015,066 | 12/1961 | Calderhead et al. | 174—52 |
| 3,054,023 | 9/1962 | Blecker et al. | 317—99 |

LEWIS H. MYERS, *Primary Examiner.*

J. R. SCOTT, *Assistant Examiner.*

U.S. Cl. X.R.

174—52